United States Patent [19]
Fortuna

[11] 4,243,277
[45] Jan. 6, 1981

[54] BALL BEARING

[75] Inventor: John E. Fortuna, Cedar Springs, Mich.

[73] Assignee: Knape & Vogt Manufacturing Co., Grand Rapids, Mich.

[21] Appl. No.: 64,386

[22] Filed: Aug. 8, 1979

[51] Int. Cl.³ ............................................. F16C 33/58
[52] U.S. Cl. .................................... 308/195; 308/3.8; 308/193
[58] Field of Search ................. 308/195, 3.8, 193, 3.6, 308/6 R, 189 R, 188, DIG. 7

[56] References Cited
U.S. PATENT DOCUMENTS

| 3,097,898 | 7/1963 | Ferdig | 308/195 |
| 4,006,945 | 2/1977 | Sekerich | 308/3.8 |
| 4,145,093 | 3/1970 | Sekerich | 308/195 |

Primary Examiner—Lenard A. Footland
Attorney, Agent, or Firm—Price, Heneveld, Huizenga & Cooper

[57] ABSTRACT

A self-contained ball bearing assembly for use in drawer rails, the balls being axially retained between a washer secured on the hollow stem of the inner race and a flared end of the inner race. The outer race has three interior diametral portions, namely an axially inner portion, an axially intermediate portion, and an axially outer portion, said axially outer portion being specially configurated with a resilient annular snap rib, said outer race being axially retained on the balls by said axially inner portion and said resilient snap rib of said outer diametral portion.

2 Claims, 2 Drawing Figures

BALL BEARING

BACKGROUND OF THE INVENTION

This invention relates to ball bearing structures and more particularly to a ball bearing structure capable of high speed fabrication and assembly, particularly advantageous for use in drawer slides.

Manufacture and assembly of bearings typically involves several components and several machining operations. Manufacture of ball bearings for uses such as inexpensive drawer slides normally necessitates a design decision of whether to sacrifice quality to hold cost down, or alternatively achieve quality at a relatively high price.

SUMMARY OF THE INVENTION

An object of this invention is to provide a ball bearing structure capable of high speed fabrication and assembly suited to automated assembly machinery, the bearing being inexpensively produced with a resulting quality equal to or better than that of expensive drawer rail bearings now existing.

The bearing has a polymeric outer race with three special different internal diametral portions, balls within the outer race, and an inner race subassembly including an axial retention washer and a hollow spindle with an enlarged end and a smaller axial stem onto which the washer is retained.

DESCRIPTION OF THE PREFERRED EMBODIMENT

Figure 1:
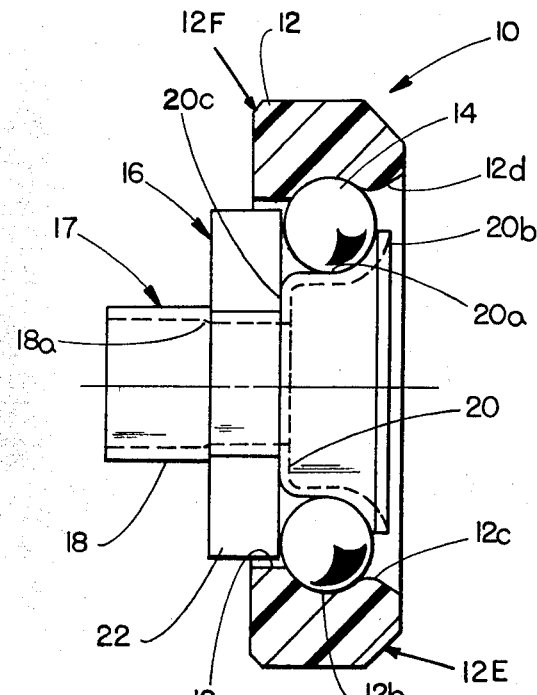
FIG. 1 is a side elevational, partially sectioned view of the novel bearing structure.

Referring specifically to the drawings, the embodiment 10 of the invention there depicted includes outer race 12, a plurality of ball bearings 14 and inner race subassembly 16 composed of a hollow formed eyelet 17 having a stem portion 18 integrally joined with an enlarged body portion 20 and an annular flat washer or plate 22.

The outer race 12 is a polymeric annular member, preferably nylon, molded to have three different interior diametral portions, the inner diametral portion 12a being the smallest in diameter, the intermediate diametral portion 12b being the largest in diameter, and the axially outer diametral portion 12c having a diameter intermediate that of the largest and smallest diameters. The flat thick washer 22 has an outside diameter smaller than the inside diametral portion 12a so as to be insertable therein for engagement with the plurality of balls 14. The intermediate diametral portion 12b is curvilinear in configuration, forming the outer track race for the balls, with the curvature thereof terminating at the inner diametral portion 12a. This curvilinear configuration also blends smoothly into the diametral portion 12c. The axial opening extending clear through the outer race terminates in an outer chamfer 12d which allows a snap-together assembly as set forth hereinafter. A chamfer 12E on the radially outer corner of the axially inner part of the outer race, and a smaller chamfer 12F on the radially outer corner of the axially outer part enables the outer race to be oriented in automated assembly equipment.

The outer race by its noted configuration features is axially retained on the plurality of balls by the annular wall of portion 12a and the resilient annular snap rib of portion 12c and does not engage any other of the components than the balls when assembled. The snap rib has a curved convex cross sectional configuration with the outer wall formed by chamfer 12d and the inner wall being part of the ball track.

The balls are radially retained between outer race 12, and particularly the outer track 12b thereof, and the inner track 20a formed on the outer periphery of body portion 20. The terminal outer edge 20a of the eyelet is flared radially outwardly at 20b so that the flared flange 20b cooperates with the axial face of washer plate 22 to axially retain the bearing balls in the assembly. Engagement of the balls with face of plate 22 is assured by the plate being secured against the annular axial shoulder 20c of body 20. Plate 22 is secured in this engaged position on the shoulder and around the stem 18 by swaging the portion of the hollow stem at 18a to an enlarged diameter slightly greater than the internal diameter of annular plate 22. This protruding portion of the stem beyond the plate 22 acts as a mounting means for the self-contained bearing. The components are coaxially arranged relative to the centerline. Thus, the unit can be attached to a stub shaft for example which can project into this outer stem portion, or within a sleeve or hole pierced or drilled through sheet metal that receives only this protruding portion, or on a shaft which extends completely through the bearing assembly.

The diametral rib portion 12c is specifically dimensioned relative to the portion 12b so that the resilient polymeric outer race, when molded, can be removed from the molding pin by temporary, resilient, radially outward deflection of the outer race. In a bearing outer race having a diameter at 12b of 0.674 inch, the diameter of portion 12c will be 0.626 inch to allow the part to be stripped from the mold die without damage to the part or requiring a secondary operation to turn the ball race. In such a unit, the diameter 12a would be 0.60 inch. The chamfer at 12d would be 0.06 inch by 45°.

Assembly proceeds with eyelet 17 having enlarged body portion 20 placed downwardly in a nest, the plurality of balls being retained therearound by a suitable sleeve (not shown), placing plate washer 22 against shoulder 20c, swaging stem 18 to lock these components together, and then snapping the outer race down around the balls by temporary deflection at diametral rib 12c, or alternatively snapping the outer race on the balls first and then swaging stem 18.

Figure 2:
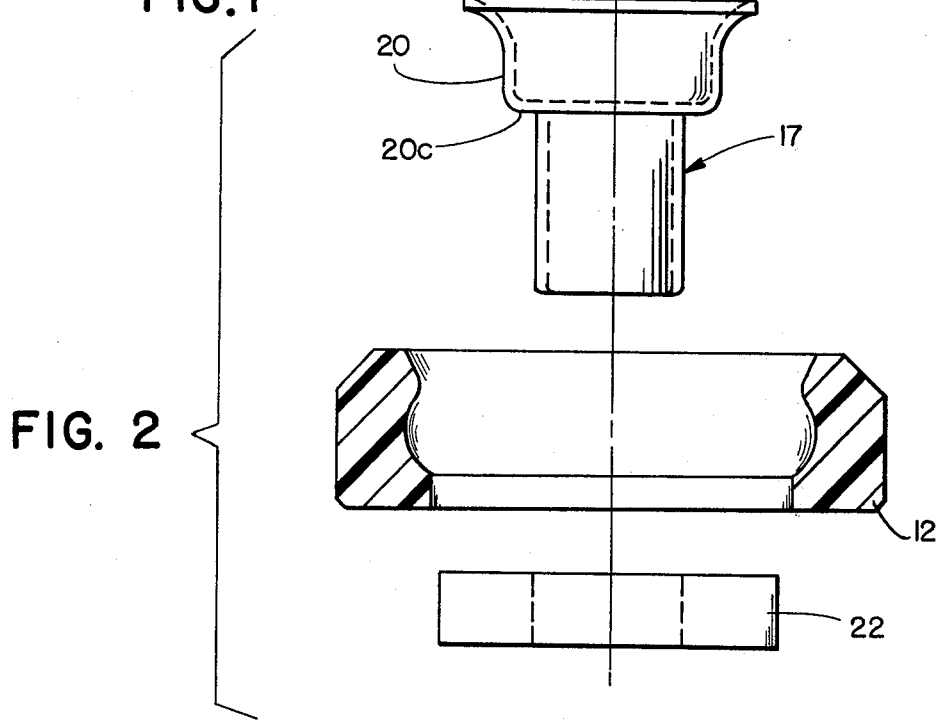
FIG. 2 is an exploded view of components (less the balls) of the bearing in FIG. 1.

Alternatively, assembly of the components can be accomplished by placing annular plate 22 in a nest or retainer, in a horizontal orientation as in FIG. 2, placing the outer race 12 in the nest, coaxial with member 22, projecting a pilot pin upwardly through both members to keep them coaxial and also to spread the plurality of balls into the outer race track, inserting the balls, and then projecting the eyelet 17, with stem downward, down through the center of the balls, and through outer race 12 and plate 22, to depress the spring biased pilot pin until shoulder 20c bottoms out on the pilot pin, at which time stem 18 is swaged to enlarge its diameter and lock the components together.

The embodiments of the invention in which an exclusive property or privilege is claimed are defined as follows:

1. A ball bearing comprising:
   an outer race, an inner race subassembly, and a plurality of balls therebetween;
   said outer race comprising a polymeric annulus having three axial portions of different internal diameters, including an inner portion of smallest diameter, an intermediate portion of largest diameter, and an outer portion; said intermediate portion forming a curvilinear, radially-outer, ball track, and said inner portion forming a ball retention shoulder; said outer portion having an annular resilient convex snap rib blending axially inwardly into said curvilinear ball track and blending axially outwardly in a chamfer;
   said inner race subassembly comprising a hollow spindle and a washer thereon; said hollow spindle having a cylindrical stem and a body with a flared wall forming a radially inner ball track; an integral shoulder between said stem and said body; said washer being on said stem against said shoulder in engagement with said balls to axially trap said balls between said annulus and said flared wall; and said stem being swaged at said annulus to so retain it on said annulus while also forming a mounting member for attachment of said bearing to a support.

2. A ball bearing comprising:
   an outer polymeric race; a hollow inner race having a flare on one end, having an axial shoulder and also an enlarged portion between its ends, and having a hollow stem on the other end; a washer on said hollow stem, retained against said shoulder by said enlarged portion of said stem; and a plurality of bearing balls retained radially between said inner and outer races and retained axially between said flare and said washer.

* * * * *